(12) United States Patent
Upparapalli et al.

(10) Patent No.: US 7,532,978 B2
(45) Date of Patent: May 12, 2009

(54) OFF-BOARD NAVIGATION SYSTEM WITH PERSONALIZED NAVIGATION DATABASE

(75) Inventors: Karunanidhi Upparapalli, Troy, MI (US); Larry Spencer, Lake Orion, MI (US)

(73) Assignee: MiTAC International Corporation, Taoyuan (TW)

( * ) Notice: Subject to any disclaimer, the term of this patent is extended or adjusted under 35 U.S.C. 154(b) by 0 days.

(21) Appl. No.: 10/096,365

(22) Filed: Mar. 12, 2002

(65) Prior Publication Data

US 2002/0177948 A1 Nov. 28, 2002

Related U.S. Application Data

(60) Provisional application No. 60/275,227, filed on Mar. 12, 2001.

(51) Int. Cl.
*G01C 21/34* (2006.01)
*G08G 1/133* (2006.01)
*G08G 1/137* (2006.01)
*G08G 1/123* (2006.01)

(52) U.S. Cl. .................. 701/209; 701/207; 701/208; 340/995.19; 340/995.24

(58) Field of Classification Search .................. 701/209, 701/200, 201, 208, 212, 213, 207; 340/990, 340/995, 995.12, 995.14, 995.27, 995.24, 340/995.19; 342/357.1, 357.09, 357.13
See application file for complete search history.

(56) References Cited

U.S. PATENT DOCUMENTS

| | | | |
|---|---|---|---|
| 5,543,789 A | | 8/1996 | Behr et al. .................. 340/995 |
| 5,699,255 A | * | 12/1997 | Ellis et al. .................... 701/212 |
| 5,802,492 A | * | 9/1998 | DeLorme et al. ............. 455/456 |
| 6,107,944 A | * | 8/2000 | Behr et al. .................. 340/995 |
| 6,121,924 A | * | 9/2000 | Meek et al. ............. 342/357.13 |
| 6,311,126 B1 | * | 10/2001 | Katayama et al. ........... 701/208 |
| 6,320,518 B2 | * | 11/2001 | Saeki et al. ............. 340/995.12 |
| 6,347,278 B2 | * | 2/2002 | Ito .............................. 701/200 |
| 6,675,092 B1 | * | 1/2004 | Katayama et al. ........... 701/208 |
| 2003/0033176 A1 | * | 2/2003 | Hancock ......................... 705/6 |

FOREIGN PATENT DOCUMENTS

| | | |
|---|---|---|
| DE | 19651146 A1 | 6/1998 |
| EP | 1106965 A1 | 6/2001 |
| WO | WO 01/13069 | 2/2001 |

* cited by examiner

*Primary Examiner*—Thomas G Black
*Assistant Examiner*—Christine M Behncke
(74) *Attorney, Agent, or Firm*—Greenberg Traurig, LLP

(57) ABSTRACT

An off-board navigation system includes a remote unit and a supply location. In operation, a navigation system user requests a desired route to a destination. Capability information relating to the user's CPU and storage device capacities are also preferably provided to the supply location. Using the extensive database available at the supply location, the supply location calculates a recommended route to the desired destination in relation to the desired POIs. If the estimated size of the requested route meets the capabilities of the remote unit the supply location creates a filter using the requested parameters and applied to the extensive database at the supply location. In one embodiment, the filtered map area includes a width vector W defined substantially perpendicular to the recommended route R. In another embodiment, the filtered map area is defined in relation to a plurality of nodes N along the recommended route R. A perimeter P is defined around each node N along the recommended route R. Moreover, the type of road can be adjusted to meet the capability information relating to the user's CPU and storage device.

27 Claims, 4 Drawing Sheets

US 7,532,978 B2

OFF-BOARD NAVIGATION SYSTEM WITH PERSONALIZED NAVIGATION DATABASE

RELATED APPLICATION

This application claims priority to U.S. Provisional Application Ser. No. 60/275,227, filed on Mar. 12, 2001.

BACKGROUND OF THE INVENTION

This invention generally relates to off-board navigation or route guidance systems and, more particularly, to a system that transmits a filtered map area including a recommended route and desired points of interest.

Navigation systems generally provide a recommended route to a desired destination. Generally, the desired destination is selected from a large database of roads stored in a mass media storage, such as a CD ROM, which includes the roads in the area to be traveled by the user. If the navigation system is installed in a vehicle, the starting point is typically associated with the vehicle position and can be input to the navigation system by an associated position determining system that usually includes a GPS (Global Positioning System) receiver.

Vehicle navigation systems include many expensive components, including a CPU with mass storage, such as a hard drive, CD or DVD, memory compact flash and RAM for storing a map database. It is therefore known to provide so-called "off-board" systems which primarily include a supply location. The supply location includes a processor that actually calculates a recommended route based upon a request from a remote unit such as a vehicle. The supply location further includes an extensive database of roads and points of interest (POIs). The supply location database is frequently updated and can include transient events such as accidents, road construction, weather issues, and the like. Further, because the supply location is not actually within the remote unit, size, weight and expense are of minimal concern. Communicating with the supply location also allows a reduction of navigation system components which must be installed within the remote unit. Moreover, only minimal processor and storage capabilities are required in the remote unit as these functions are performed off-board at the supply location.

In response to a request from the remote unit, the recommended route is sent to the remote unit and displayed to the user as a map showing the desired destination and highlighting the recommended route. The on-board navigation system will then autonomously guide the driver to the selected destination based upon the information sent from the supply location. Preferably, if the navigation system is installed in a vehicle, the on-board navigation system displays the current position of the vehicle and provides visual turn-by-turn instructions to the driver based upon position and motion determining devices located within the remote unit.

One known off-board navigation system requires the remote unit to maintain the large database of roads stored in a mass media storage device. By maintaining the road database on-board, only the recommended route need be transmitted from the supply location to the remote unit. This is quick and efficient. However, this known system still requires the remote unit to carry a rather extensive suite of navigation system processor and storage device components which limits the advantages of providing the processing capabilities at a supply location. Further, the supply location may have a more recently updated database of roads than that stored in the remote unit. Difficulties may therefore arise in the application of a route calculated at the supply location to the older database stored in the remote unit.

In another known off-board system, the entire database of roads along with the recommended route is transmitted from the supply location to the remote unit. Although this known system assures that the most recent database is transmitted to the remote unit, a rather long period of time is typically required to transmit the database of roads and the recommended route from the supply location to the remote unit. Again, this known system also requires the remote unit to carry a rather extensive suite of storage device components to receive and store the extensive database of roads and the recommended route.

It is thus desirable to provide an efficient off-board navigation system which assures that the latest database of roads is available to a remote unit having a minimum of on-board navigation system components. It is further desirable to allow a user to request particular POIs to meet personal desires of the user.

SUMMARY OF THE INVENTION

In general terms, this invention provides an off-board navigation system. The system generally includes a remote unit and a supply location.

The supply location maintains an extensive database of roads and possible points of interest (POIs). The supply location extensive database is frequently updated and can include transient events such as accidents, road construction, weather issues, and the like. Further, because the supply location is not actually within the remote unit, size, weight and expense are of minimal concern.

A communication link permits two-way communication between a plurality of the remote units and the supply location. The communication link is preferably wireless for use with the vehicle based remote unit. A computer link such as the Internet may also be provided for use between the personal computer based remote unit and the supply location.

In operation, a navigation system user requests directions to a destination. The user may also preferably requests a plurality of other information, including transportation routes via desired cities or POIs. The POIs are preferably provided to the user as a plurality of categories such as restaurants, historical sites, lodgings, beaches, shopping, and many other categories. The user may also preferably request intermediate points along the desired route such as "Auburn Hills, Mich. to San Diego Calif. via Houston, Tex."

Capability information relating to the user's CPU and storage device capacities are also preferably provided to the supply location. The request is then transmitted from the remote unit to the supply location.

Using the extensive database available at the supply location, the supply location calculates a recommended route to the desired destination in relation to the desired POIs. At this step, an error check routine is performed to assure that the estimated size of the map area necessary to display the desired route is within the capabilities of the remote unit. The error message provides the user with an estimated size of the map area in response to the user requirements.

If the estimated size of the requested route meets the capabilities of the remote unit the supply location creates a filter using the requested parameters. The filter is then applied to the extensive database at the supply location. The filter includes the desired POIs and any other user requested parameters. Preferably, the filter provides a filtered map area.

In one embodiment, the filtered map area includes a width vector W defined substantially perpendicular to the recommended route R.

In another embodiment, the width vectors W is defined by the supply location to take full advantage of the capability information relating to the user's CPU and storage device. In other words, the greater the capabilities of the user's CPU and storage device, the greater the length of width vector W.

In another embodiment, the filtered map area is defined in relation to a plurality of nodes N along the recommended route R. A perimeter P is defined around each node N along the recommended route R. Additionally, a perimeter P may also be defined around each requested POI. Moreover, the type of road can be adjusted to meet the capability information relating to the user's CPU and storage device. That is, the more major roads are provided while the more secondary roads are filtered out.

Accordingly, an efficient off-board navigation system is provided which assures that the latest database of roads is available to a remote unit having a minimum of on-board navigation system components.

BRIEF DESCRIPTION OF THE DRAWINGS

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
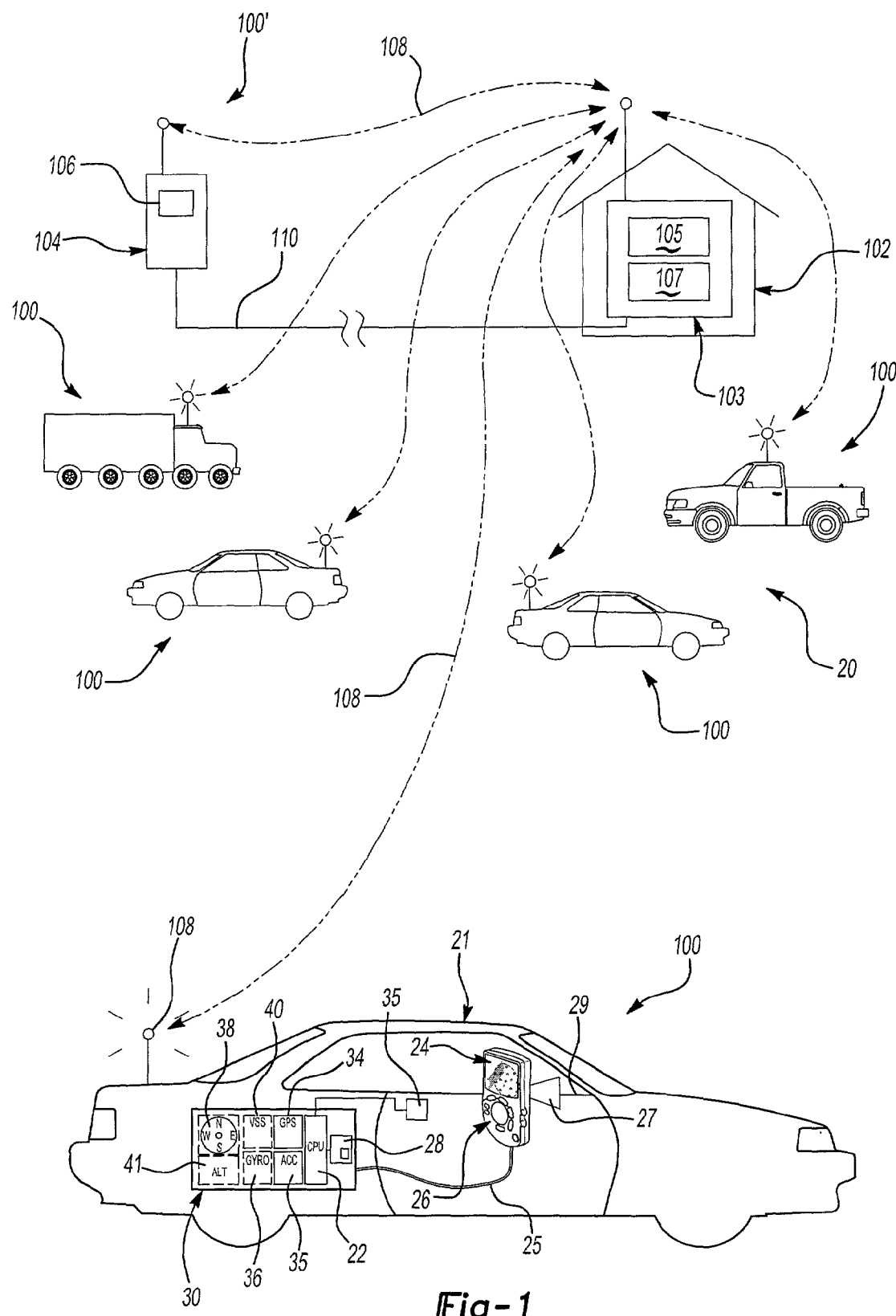
FIG. 1 is a schematic view of an off-board navigation system according to the present invention.

The off-board navigation system 20 of the present invention is shown schematically in FIG. 1. The system 20 generally includes a remote unit 100 and a supply location 102. A plurality of remote units 100 preferably have simultaneous access to the supply location 102. The supply location 102 includes a navigation system computer module 103 having a storage device 105 which communicates with a CPU 107. The supply location 102 maintains an extensive database of roads and possible points of interest (POIs) within the storage device 105. The supply location 103 extensive database is frequently updated and can include transient events such as accidents, road construction, weather issues, and the like. Further, because the supply location 102 is not actually within each remote unit 100, size, weight and expense is of minimal concern. As will be further described below, the CPU 107 filters the extensive database in response to a user request prior to transmitting a user defined filtered map area to the remote unit 100, 100'.

Preferably, the remote unit 100 is a vehicle 21. However, the remote unit 100' may also be a personal computer or portable hand held system (shown schematically at 104). The personal computer 104 preferably includes a removable storage media 106 such as a hard drive, compact flash memory, CD ROM, DVD, RAM, ROM or other optically readable storage, magnetic storage or integrated circuit. It should be realized that the personal computer 104 can be a laptop, hand-held, electronic organizer, desktop or the like. Primarily, the personal computer 104 provides access to the supply location 102 and typically will not include the navigation and inertia sensors provided within the vehicle 21.

A communication link 108 permits two-way communication between the remote units 100, 100' and the supply location 102. The communication link 108 is. preferably wireless for use with the vehicle 21 based remote unit 100. A computer link 110 such as the Internet may also be provided for use between the personal computer 104 based remote unit 100' and the supply location 102. When using the personal computer 104, a user preferably accesses the supply location 102 as will be further described below and stores the results on the removable storage media 106. The removable storage media 106 may then be transferred to the vehicle 21. Advantageously, a user requests directors to a destination. The user may also select particular categories of POIs to personalize the route. The supply location 102 responds by assembling a recommended route including POIs in the requested categories of POIs and replies to the remote unit 100. The recommended route can then be adjusted if necessary to suit the user preferences and choices.

The remote unit 100 preferably includes an Operator Interface Module ("OIM") 22 including input and output devices. The OIM 22 includes a display 24, such as a high resolution LCD or flat panel display, and an audio speaker 26. The OIM 22 also includes input devices 28, preferably a plurality of buttons and directional keypad, but alternatively including a mouse, keyboard, keypad, remote device or microphone. Alternatively, the display 24 can be a touch screen display.

The navigation system 20 further includes a navigation system computer module 30 connected to the OIM 22 through a connection 25. The navigation system computer module 30 includes a CPU 32 and storage device 34 connected to the CPU 32. Because the present invention includes an off-board navigation system which communicates with the supply location 102, the CPU 32 and storage device 34 can advantageously be provided with reduced capabilities thereby reducing expense and complexity. The storage device 34 may include a hard drive, CD ROM, DVD, RAM, ROM or other optically readable storage, magnetic storage or integrated circuit. The storage device 34 contains a database 36 which receives a filtered map area including the filtered roads and POIs supplied by the central location 102. Preferably, the CPU 32 and storage device 34 communicate with a port 35 that receives data from removable storage media 106. The software for the CPU 32, including the graphical user interface, route guidance, operating system, position-determining software, etc may also be stored in storage device 34 or alternatively in ROM, RAM or flash memory.

The navigation system computer module 30 preferably includes navigation sensors, such as a GPS receiver 38 and an inertial sensor, which is preferably a multi-axis accelerometer 40. The computer module 30 may alternatively or additionally include one or more gyros 42, a compass 44, a wheel speed sensor 46 and altimeter 48, all connected to the CPU 32. Such position and motion determining devices (as well as others) are well known and are commercially available.

The system 20 propagates the position of the, vehicle 21 relative to the map database 36, (transmitted from the supply location 102) i.e. relative positions on road segments and intersections ("nodes"). The navigation system computer module 30 also determines the current location of the vehicle 21 in terms of latitude and longitude. Utilizing any of a variety of known techniques, the position of the vehicle 21 relative to the database 36 and/or in terms of latitude and longitude is determined at least in part based upon the motion signals from the multi-axis accelerometer 40. The current local time and date can be determined from the GPS signals received by the GPS receiver 38.

Generally, the CPU 32 and position and motion determining devices autonomously determines the position of the vehicle 21 relative to the database 36 of roads utilizing dead reckoning, map-matching, etc. Further, as is known in navigation systems, the user can select a destination relative to the database 36 of roads utilizing the input device 28 and the display 24 which is transmitted to the supply location 102. Preferably, the navigation system 20 displays turn-by-turn instructions on display 24 and gives corresponding audible instructions on audio speaker 26, guiding the driver to the desired destination.

Figure 2A:
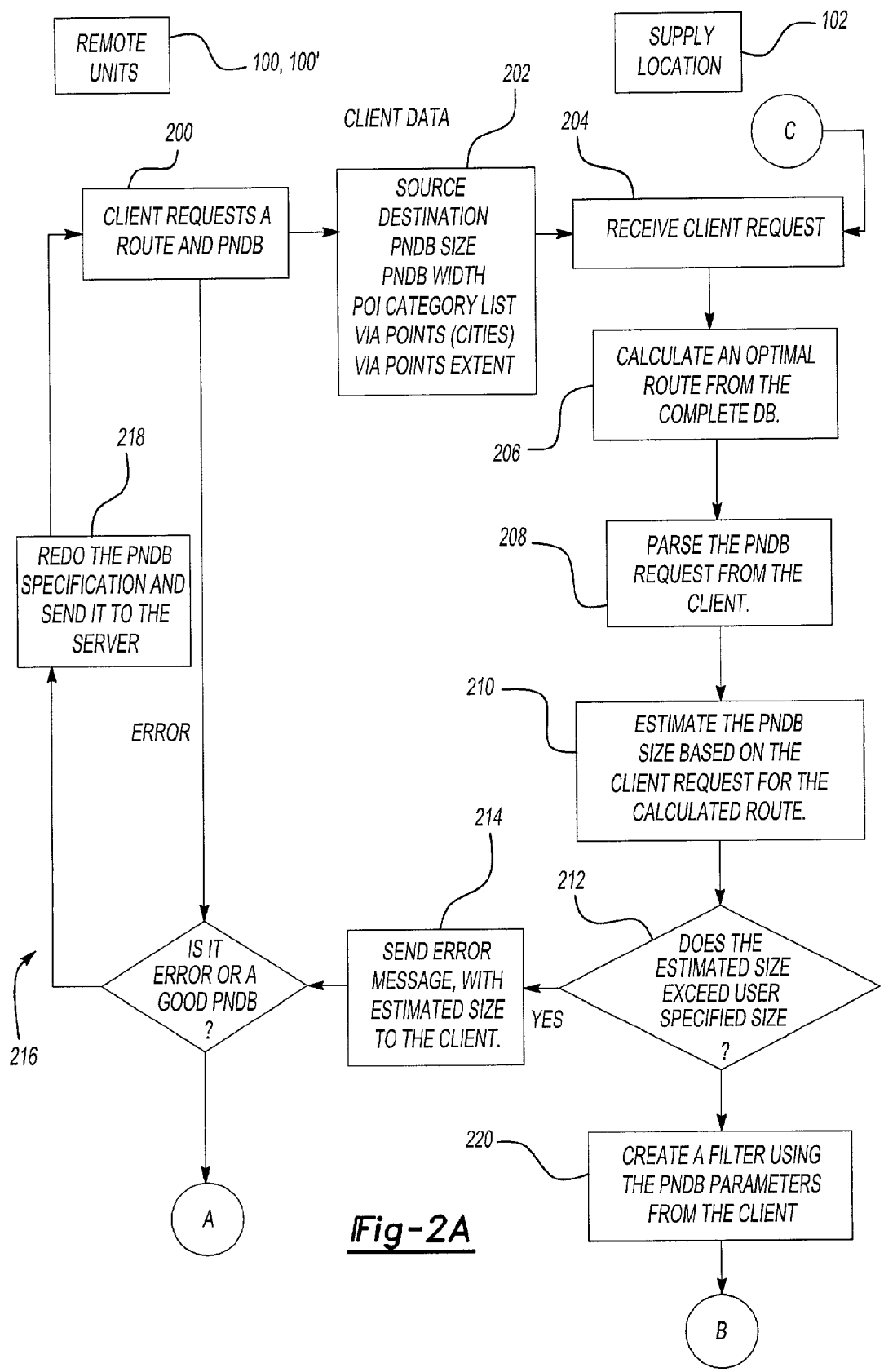
FIGS. 2A and 2B illustrate a flow chart providing the methodology for operation of the present invention.
Figure 2B:
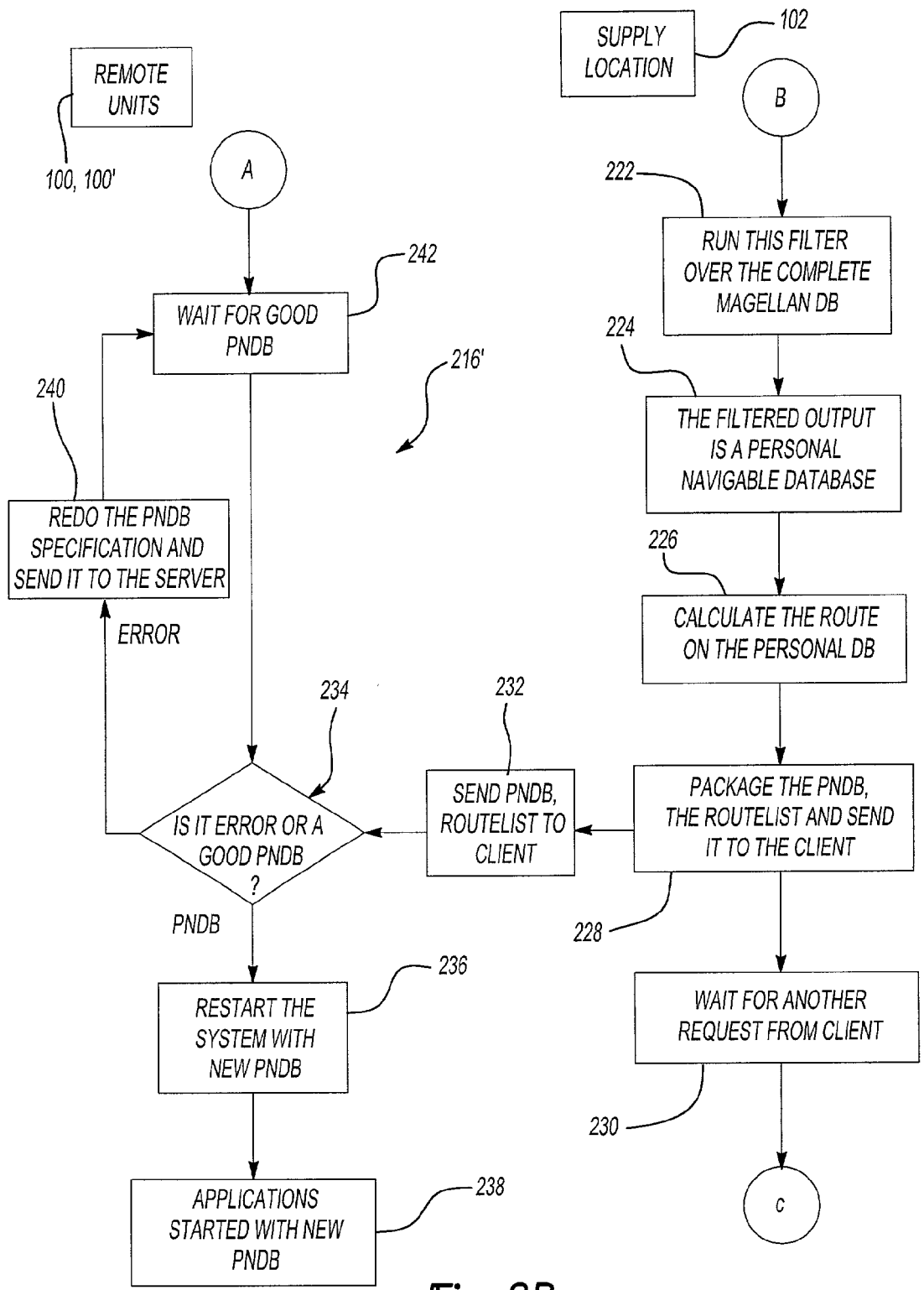

FIG. 2 is a flow chart illustrating the operation of the off-board navigation system 20 (FIG. 1) according to the present invention. In step 200, a navigation system user requests a recommended route to a desired destination. The user also preferably requests and provides a plurality of information (step 202). Such information preferably includes a start point and a destination point. The start point may be input manually by the user or is operating a remote unit such as remote unit 100'. The computer module 30 in remote unit 100 may also automatically determine the start point. The start point may be the vehicle 21 location or calculated start point. This is particularly advantageous in vehicles to minimize demands upon a user.

Advantageously, a user requests a route including transportation routes via desired cities or POIs. The POIs are preferably provided to the user as a plurality of categories such as restaurants, historical sites, lodgings, beaches, shopping, and many other categories. The user may also preferably request intermediate points along the desired route such as "Auburn Hills, Mich. to San Diego, Calif. via Houston, Tex."

Capability information relating to, for example, the user's CPU 32 and storage device 34 capacities are also preferably provided to the supply location 102 (FIG. 1). The capability information can be provided automatically or manually. As will be further described below, the capability information allows the supply location 102 to filter the extensive database of roads and possible POIs into a filtered map area which corresponds to the capabilities of a particular user's CPU 32 and storage device 34.

The request (step 202), including data from step 202 is then transmitted from the remote unit 100, 101' to the supply location 102 (FIG. 1) at step 204. The supply location 102 receives the request via communication link 108 such as the wireless link 108 or Internet link 110. Using the extensive database available at the supply location 102, the supply location calculates a recommended route to the desired destination in relation to the desired POIs at step 206. At this step, a recommended route to the desired destination in relation to the desired POIs is determined on the extensive database at the supply location 102 in step 208.

At step 210, the supply location 102 determines an estimated size of a map area which includes the recommended route to the desired destination in relation to the desired POIs. The estimated size is based upon the requested destination and is compared to the capability information of the remote unit 100' at step 212. If the estimated size of the map area necessary to display a recommended route to the requested destination is greater than the capabilities of the remote unit 100, the system sends an error message at step 214 and enters an error loop 216 so that the user can redo the request at step 218. The supply location 102 preferably estimates the map areas based upon a distance to the destination. The error message provides the user with an estimated size of the map area in response to the user request.

If the estimated size of the requested route meets the capabilities of the remote unit 100 at step 212, the supply location 102 creates a filter at step 220 using desired parameters from the remote unit 100, 100'. At step 222 the filter created in step 220 is applied to the extensive database at the supply location 102.

Figure 3A:
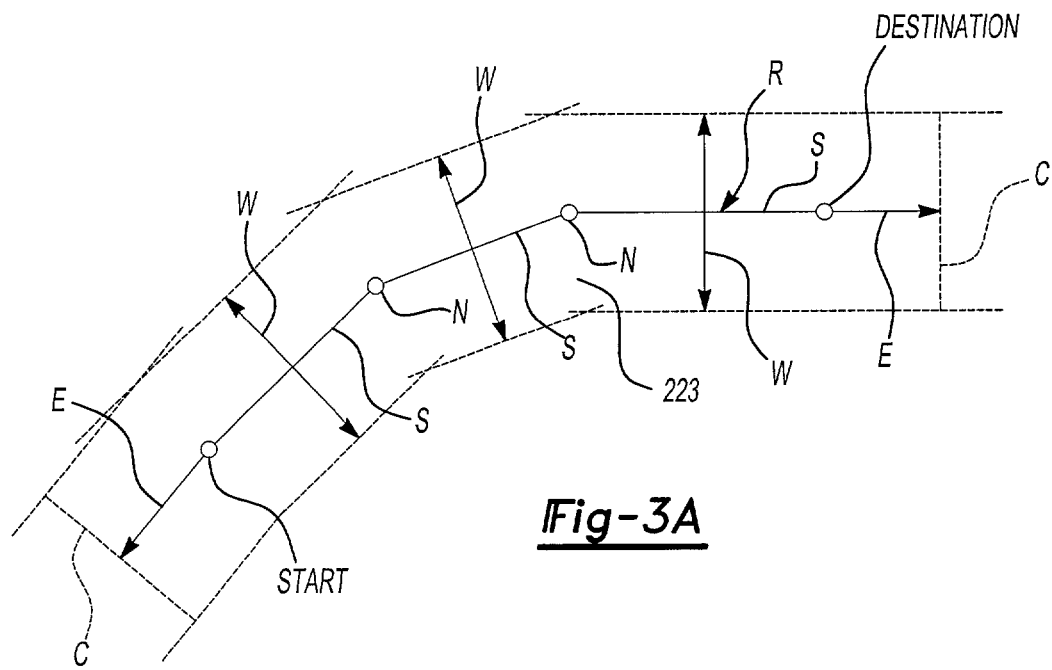
FIG. 3A is a schematic representation of one embodiment for calculating a filtered map area according to the present invention.
Figure 3B:
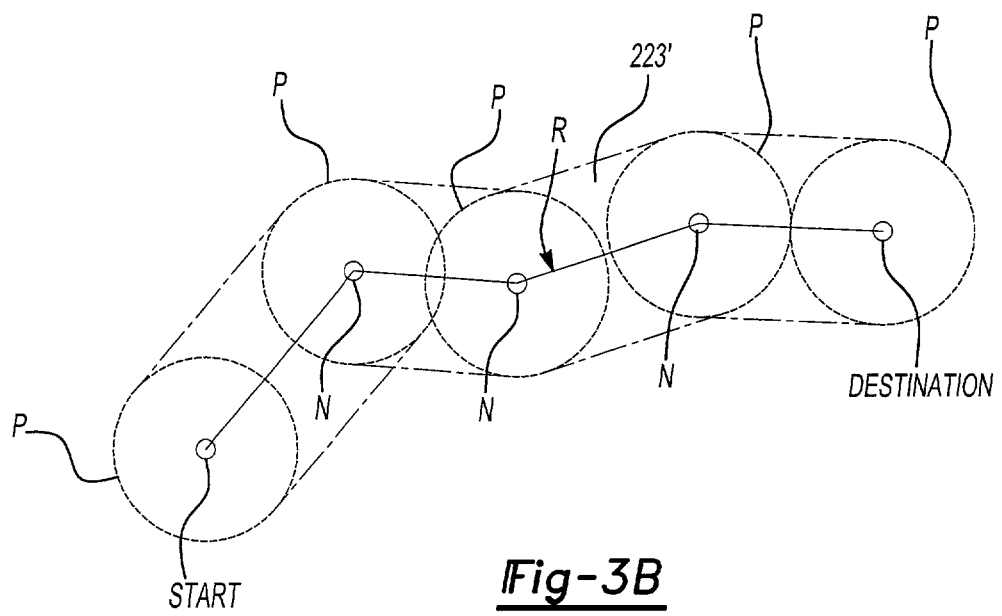
FIG. 3B is a schematic representation of another embodiment for calculating a filtered map area according to the present invention.

The filter includes the desired POIs and any other user defined parameters. Preferably, the filter provides a filtered map area 223 (FIGS. 3A and 3B). The filtered map area 223 preferably includes at least the recommended route to the requested destination and the particular POIs which fall within the user-selected categories of information. However, additional information can be further provided within the filtered map area 223 depending upon the capabilities of a user's system.

For example only, a first user having a minimal system may only receive a recommended route and the single category of POIs which met their request. A second user, with greater system capabilities, however, would not only receive a recommended route and the single category of requested POIs, but would also receive additional categories of POIs. Alternately or in addition, the second user would receive a more detailed secondary and tertiary road types other than what is necessary for the recommended route. The additional information type received can be based upon user preferences or automatically determined at the supply location 102.

It should be understood that the system preferably provides a filtered map area which is particularly tailored to the user. That is once a user profile has been defined the filtered map area will be tailored to that particular user. For example only, one user may be presented with all refueling stations and no shopping areas, while a second user will be provided with all refueling stations and all restaurants of a particular class.

The overall size of the filtered map area 223 may also be adjusted to meet the capabilities of the remote unit 100. In one embodiment, the filtered map area 223 includes a width vector W defined substantially perpendicular to the recommended route R (FIG. 3A). In one embodiment, the width W is defined at each segment S located between each node N along the recommended route R. End point lengths such as vectors E define a cap end C to the filtered map area 223. The cap ends C are defined substantially perpendicular to the vectors E. The length of the width vectors W may be input directly by the user. For example only, a user may specify that width vector W are three (3) miles. Thus, the filtered map area 223 is defined within three (3) miles of the recommended route R.

In another embodiment, the width vectors W is defined by the supply location 102 to take full advantage of the capability information relating to the user's CPU 32 and storage device 34. In other words, the greater the capabilities of the user's CPU 32 and storage device 34, the greater the length of width vector W.

In another embodiment, the filtered map area 223' (FIG. 3B) is defined in relation to a plurality of nodes N along the recommended route R. A perimeter P is defined around each node N along the recommended route R. Additionally, a perimeter P may also be defined around each POI. Preferably, the filtered map area 223' is defined by tangentially connecting each perimeter P in relation to the recommended route R. The perimeter P may be input directly by the user. Alternately, the perimeter P is defined by the supply location 102 to take full advantage of the capability information relating to the user's CPU 32 and storage device 34.

Moreover, the type of road can be adjusted to meet the capability information relating to the user's CPU 32 and storage device 34. That is, the more major roads are provided while the more secondary roads are filtered out.

Step 224 provides the filtered map area 223, 223'. The recommended route R (FIGS. 3A and 3B) is calculated on filtered map area 223, 223' in Step 226 and packaged to send to the client in step 228. The packaging of step 228 is dependent on the communication link and is particularly tailored for a wire-less, Internet, or other type of communication link.

After step 228 the supply location 102 branches to step 230 and awaits further requests from the remote units 100, while the remote unit receives the filtered map area 223, 223' and recommended route data at step 234. Step 234 preferably provides an error check loop at step 216' which confirms that the filtered map area 223, 223' is received. Otherwise, the remote unit 100, 100' resends the request to the supply location at step 240 unit confirmed at step 242.

If the transmitted filtered map area 223, 223' of step 232 is confirmed to be error free, the remote unit 100, 100' is restarted at step 236 with the filtered map area 223, 223'. In step 238, the computer module 30 of remote unit 100 can thereafter perform navigation system functions autonomously in relation to filtered map area 223, 223'.

It should be understood that once the filtered map area 223 is provided to the remote unit 100, in addition to performing navigation system functions autonomously in relation to filtered map area 223, 223', the remote unit 100 can independently recalculate routes on the filtered map area without returning to the supply location 102. That is, the filtered map area 223, 223' contains sufficient detail to allow recalculation of a route using the filtered map area 223 alone. The remote unit 100 therefore advantageously avoids returning to the supply location when the filtered map area 223, 223' provides sufficient detail.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method for providing information to a remote unit for guiding a user of an off-board vehicle navigation system along a recommended route, the method comprising:

receiving, at a supply location prior to any calculation of the route, a request from a remote unit for a route to a destination and a desired category representing a plurality of closely related points of interest;

calculating a recommended route to the destination in relation to the desired category on a database of roads and categories located at the supply location;

filtering the database to provide a filtered map area including the recommended route and a point of interest among the plurality of closely related points of interest;

receiving, at the supply location, information from the remote unit defining a width substantially perpendicular to the recommended route or a perimeter around each of a plurality of nodes along the recommended route;

determining, at the supply location, sizing of the filtered map area in response to the width or perimeter information; and transmitting the filtered map area to the remote unit.

2. The method as recited in claim 1 further comprising:

receiving, at the supply location, capability information regarding the remote unit; and wherein the determining sizing of the filtered map area includes sizing of the filtered map area in response to the capability information.

3. The method as recited in claim 1 wherein the filtering includes filtering the database in relation to a road type within the database.

4. The method as recited in claim 1 wherein the filtering includes filtering the database in relation to a plurality of nodes along the recommended route.

5. The method as recited in claim 1 wherein:

the received information is the perimeter; and the determining sizing of the filtered map area is in response to the perimeter information.

6. The method as recited in claim 1 further comprising:

receiving, at the supply location, capability information regarding the remote unit; and wherein the determining sizing of the filtered map includes determining sizing of a perimeter around each of a plurality of nodes along the recommended route in response to the capability information.

7. The method as recited in claim 1 wherein the transmitting comprises sending information via a wireless communication link.

8. The method as recited in claim 1 further comprising:

receiving, at the supply location, capability information regarding the remote unit; and wherein the determining sizing of the filtered map includes determining a perimeter around each of the points of interest in response to the capability information.

9. The method as recited in claim 1 wherein the desired category is selected from a plurality of categories.

10. The method as recited in claim 9 wherein the plurality of categories is selected from a group comprising restaurants, lodgings, historical sites, beaches, and shopping.

11. The method as recited in claim 1 wherein the remote unit includes a personal computer.

12. The method as recited in claim 1 wherein the remote unit is located within a vehicle.

13. The method as recited in claim 1 wherein the transmitted filtered map area is suitable for guiding a vehicle along the recommended route using map matching.

14. The method as recited in claim 1 wherein the remote unit is configured so that the desired category is preloaded and selected into the remote unit before a second route is determined.

15. A method for providing information to a remote unit for guiding a user of an off-board vehicle navigation system along a recommended route, the method comprising:

receiving, at a supply location prior to any calculation of the route, a request from a remote unit for a route to a destination and a desired category representing a plurality of closely related points of interest from a plurality of categories;

receiving, at the supply location, sizing information at least partially defining a filtered map area;

calculating a recommended route to the destination in relation to the desired category on a database of roads and categories located at the supply location;

filtering the database to provide the filtered map area including the recommended route and at least one point of interest among the plurality of closely related points of interest;
determining sizing of the filtered map area in response to the received sizing information; and
transmitting the filtered map area to the remote unit.

16. The method as recited in claim 15 further comprising providing an error check, the error check including estimating a size of the filtered map area in relation to a distance to the destination.

17. The method as recited in claim 15 wherein the sizing information is definable by a user.

18. A method for providing information to a remote unit for guiding a user of an off-board vehicle navigation system along a recommended route, the method comprising:
receiving, at a supply location prior to any calculation of the route, a request from a remote unit for a route to a destination and a desired category from a plurality of categories, the desired category representing a plurality of closely related points of interest;
receiving, at the supply location, information from the remote unit defining a capability of the remote unit;
calculating a recommended route to the destination in relation to the desired category on a database of roads and categories located at the supply location;
filtering the database to provide a filtered map area including the recommended route and at least one point of interest among the plurality of closely related points of interest;
determining sizing of the filtered map area in response to the capability information; and
transmitting the filtered map area to the remote unit.

19. The method as recited in claim 18 wherein the transmitted filtered map area is suitable for guiding the vehicle along the recommended route using map matching.

20. A method for providing information to a remote unit for guiding a user of an off-board vehicle navigation system along a recommended route, the method comprising:
receiving, at a supply location prior to any calculation of the route, a request from a remote unit for a route to a destination and a desired category, the desired category representing a plurality of closely related points of interest;
calculating a recommended route to the destination in relation to the desired category on a database of roads and categories located at the supply location;
filtering the database to provide a filtered map area including the recommended route and a point of interest among the plurality of closely related points of interest;
receiving client information at the supply location from the remote unit defining at least one of: a width substantially perpendicular to the recommended route, and a perimeter around each of a plurality of nodes along the recommended route;
determining, at the supply location, sizing of the filtered map area in response to the client information; and
transmitting the filtered map area to the remote unit.

21. The method as recited in claim 20 further comprising:
receiving, from the remote unit, information defining a capability of the remote unit; and
determining sizing of the filtered map area in response to the capability information.

22. The method as recited in claim 20 wherein the desired category is selected from a plurality of categories.

23. A method for providing information to a remote unit for guiding a user of an off-board vehicle navigation system along a recommended route, the method comprising:
receiving, at a supply location prior to any calculation of the route, a request from a remote unit for a route to a destination and a desired category, the desired category representing a plurality of closely related points of interest;
calculating a recommended route to the destination in relation to the desired category on a database of roads and categories located at the supply location;
filtering the database to provide a filtered map area including the recommended route and a point of interest among the plurality of closely related points of interest;
receiving, from the remote unit, information defining a capability of the remote unit;
determining, at the supply location, sizing of a perimeter around each of a plurality of nodes along the recommended route in response to the capability information; and
transmitting the filtered map area to the remote unit.

24. The method as recited in claim 23 wherein the transmitting comprises sending information via a wireless communication link.

25. The method as recited in claim 23 wherein:
the request from the remote unit includes an intermediate point; and
the determining sizing includes determining sizing of a perimeter around the intermediate point.

26. A method for providing information to a remote unit for guiding a user of an off-board vehicle navigation system along a recommended route, the method comprising:
receiving, at a supply location prior to any calculation of the route, a request from a remote unit for a route to a destination and a desired category, the desired category representing a plurality of closely related points of interest;
calculating a recommended route to the destination in relation to the desired category on a database of roads and categories located at the supply location;
filtering the database to provide a filtered map area including the recommended route and a point of interest among the plurality of points of interest;
receiving, from the remote unit, information defining a capability of the remote unit;
determining, at the supply location, sizing of a perimeter around each of the points of interest in response to the capability information; and
transmitting the filtered map area to the remote unit.

27. The method as recited in claim 26 wherein:
the request from the remote unit includes an intermediate point; and
the determining sizing includes determining sizing of a perimeter around the intermediate point.

* * * * *